(12) United States Patent
Park

(10) Patent No.: US 8,786,752 B2
(45) Date of Patent: Jul. 22, 2014

(54) DIGITAL DEVICE AND METHOD FOR CONTROLLING THE SAME

(71) Applicant: LG Electronics Inc., Seoul (KR)

(72) Inventor: Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 45 days.

(21) Appl. No.: 13/729,291

(22) Filed: Dec. 28, 2012

(65) Prior Publication Data

US 2014/0125820 A1    May 8, 2014

(30) Foreign Application Priority Data

Nov. 7, 2012    (KR) .................. 10-2012-0125265

(51) Int. Cl.
*H04N 5/222*    (2006.01)
*G06K 9/00*    (2006.01)

(52) U.S. Cl.
USPC ...... 348/333.02; 382/103; 382/104; 382/106; 382/108; 382/113

(58) Field of Classification Search
CPC ................................................. H04N 13/0271
See application file for complete search history.

(56) References Cited

U.S. PATENT DOCUMENTS

| | | | |
|---|---|---|---|
| 7,990,455 B2 * | 8/2011 | Iga | 348/333.02 |
| 2007/0297683 A1 | 12/2007 | Luo et al. | |
| 2010/0073487 A1 * | 3/2010 | Sogoh et al. | 348/207.1 |
| 2010/0122208 A1 * | 5/2010 | Herr et al. | 715/799 |
| 2010/0149399 A1 * | 6/2010 | Mukai et al. | 348/333.02 |
| 2011/0299725 A1 * | 12/2011 | Rodriguez et al. | 382/100 |
| 2011/0320495 A1 | 12/2011 | Levy-Yurista et al. | |

FOREIGN PATENT DOCUMENTS

| | | | |
|---|---|---|---|
| KR | 10-2006-0108972 A | | 10/2006 |
| KR | 10-0747697 B1 | | 8/2007 |
| KR | 10-2009-0112349 A | | 10/2009 |

\* cited by examiner

*Primary Examiner* — Lin Ye
*Assistant Examiner* — John H Morehead, III
(74) *Attorney, Agent, or Firm* — Birch, Stewart, Kolasch & Birch, LLP

(57) ABSTRACT

The method for controlling a digital device comprises the steps of acquiring at least one image data, wherein the image data includes a still image or moving picture image; extracting additional information of the acquired image data, wherein the additional information includes position information and time information of a recording device corresponding to actual time and location when the image data are recorded by the recording device; generating path information on a map related to the image data, on the basis of the additional information; and displaying a path of the image data on the map in a form of line on the basis of the generated path information, wherein the step of displaying the path includes dividing the path into one or more sections, and adjusting line thickness of the divided sections in accordance with amount of the image data according to a distance within the divided section.

20 Claims, 18 Drawing Sheets

(a)

(b)

DIGITAL DEVICE AND METHOD FOR CONTROLLING THE SAME

This application claims the benefit of the Korean Patent Application No. 10-2012-0125265, filed on Nov. 7, 2012 which is hereby incorporated by reference as if fully set forth herein.

BACKGROUND OF THE INVENTION

1. Field of the Invention

The present invention relates to a digital device and a method for controlling the same, and more particularly, to a digital device that displays image data recorded by a recording device, together with a path on a map, and a method for controlling the same.

2. Discussion of the Related Art

In accordance with the lightweight and miniaturization tendency of a digital device, the digital device has been widely used, and various wearable computers and portable devices have been developed. Also, many people record and store information on their daily life in various social networks by using a digital device. This record will be referred to as life log.

In more detail, a user may record his/her daily life in the form of photos, moving picture images, etc. by using various applications within a digital device. Accordingly, the information on time and space, which is sent from the user, may be recorded in a database.

Business providers may use data processed by life log for marketing, product development, etc., and the user may easily identify his/her daily life pattern or time management pattern, whereby the industry and market related to the life log has been increased.

In the meantime, the user may identify what the path moved by himself/herself is and what image data recorded on the path is, through the life log. In particular, if the life log is displayed by being mapped into a map, the user may visually identify the time spent by himself/herself and his moving path more easily.

However, even in this case, there is inconvenience in that it is difficult for the user to separately identify information on the road and building in which the user has been interested or at which the user has looked intensively, and the user should identify the information by depending on his/her memory only.

SUMMARY OF THE INVENTION

Accordingly, the present invention is directed to a digital device and a method for controlling the same, which substantially obviate one or more problems due to limitations and disadvantages of the related art.

An object of the present invention is to provide a digital device and a method for controlling the same, in which a user may identify his/her moving path by using image data recorded by himself/herself and display the moving path by mapping the moving path into a map. In this case, the present invention is intended to provide a digital device and a method for controlling the same, which displays the moving path of the user by reflecting the user's interest level.

Another object of the present invention is to provide a digital device and a method for controlling the same, in which a line thickness corresponding to a section is controlled depending on a moving speed per section or the amount of image data when a user's moving path is displayed by being mapped into a map.

Other object of the present invention is to provide a digital device and a method for controlling the same, in which a main thumbnail reflecting a user's interest level is extracted from image data recorded by the user and then displayed together with the user's moving path.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a digital device comprises the steps of acquiring at least one image data, wherein the image data includes a still image or moving picture image; extracting additional information of the acquired image data, wherein the additional information includes position information and time information of a recording device corresponding to actual time and location when the image data are recorded by the recording device; generating path information on a map related to the image data, on the basis of the additional information; and displaying a path of the image data on the map in a form of line on the basis of the generated path information, wherein the step of displaying the path includes dividing the path into one or more sections, and adjusting line thickness of the divided sections in accordance with amount of the image data according to a distance within the divided section.

In another aspect of the present invention, a digital device comprises a processor controlling an operation of the digital device; a display unit outputting images on the basis of a command of the processor; a communication unit transmitting and receiving data to and from an external device; and a storage unit storing the command of the processor and the data, wherein the processor acquires at least one image data wherein the image data includes a still image or moving picture image, extracts additional information of the acquired image data, wherein the additional information includes position information and time information of a recording device, which correspond to the time when the image data are recorded by the recording device, generates path information on a map related to the image data, on the basis of the additional information, and displays a path for the image data on the map in the form of line on the basis of the generated path information, and also divides a section of the path and adjusts a line thickness of the divided section in accordance with an amount of the image data corresponding to a distance within the divided section.

According to one embodiment of the present invention, a user may identify his/her moving path by using image data recorded by himself/herself and display the moving path that reflects the user's interest level. Accordingly, the user may visually and easily identify the path and place in which the user has been interested.

Also, according to another embodiment of the present invention, the user may display his/her moving path through mapping of the moving path into a map by adjusting a line thickness corresponding to an section in accordance with a moving speed per section or the amount of image data. Accordingly, the user may identify his/her interest path by intuition through the line thickness.

According to other embodiment of the present invention, the user may extract a main thumbnail reflecting his/her interest level from image data recorded by himself/herself and display the extracted thumbnail together with his/her moving path. Accordingly, the user may easily and quickly identify his/her interest place or path through the main thumbnail.

More detailed advantageous effects will be described hereinafter.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
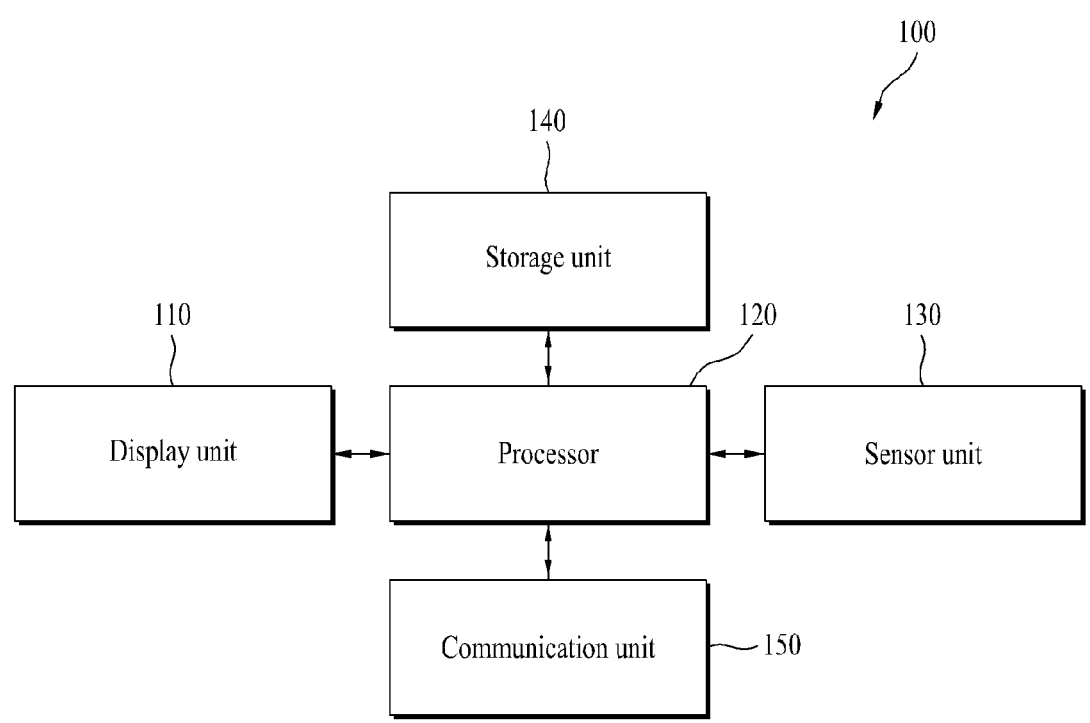
FIG. 1 is a functional block diagram illustrating a digital device according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments of the present invention will be described with reference to the accompanying drawings and the disclosure of the accompanying drawings, it is to be understood that the present invention is not limited by the embodiments.

Also, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Also, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The present invention is intended to provide a digital device that displays image data recorded by a recording device together with a path on a map. The recording device is a device that records external images, and its examples may include an image recording device such as a camera and a camcorder, a portable device such as a smart phone that includes an image sensor, and a wearable device such as a head mound display (HMD) that includes an image sensor. Also, the image data recorded by the recording device may be photos, moving picture images, still images, etc.

Accordingly, a user may record various kinds of images for a specific building or specific road by using the recording device, and the recording device generates image data according to the present invention through the recorded image.

Also, examples of the digital device include all devices that are connected with a recording device through a network and may display image data by receiving the image data from the recording device. For example, examples of the digital device may include a cellular phone, a tablet PC, a personal digital assistant (PDA), and a smart TV.

Also, the digital device may be paired with the recording device, and may be the same device as the recording device.

FIG. 1 is a functional block diagram illustrating a digital device according to one embodiment of the present invention. However, FIG. 1 is one embodiment for description of the present invention, and some units may be deleted or new units may be added depending on the need of the person skilled in the art within the scope of the present invention.

As shown in FIG. 1, the digital device 100 of the present invention may include a display unit 110, a processor 120, a sensor unit 130, a storage unit 140, and a communication unit 150.

The display unit 110 outputs images in a display screen. Accordingly, the display unit 110 may output image data on the basis of contents implemented by the processor 120 or a control command of the processor 120. At this time, the digital device 100 may receive image data from the recording device through the communication unit 150, and may output the received image data through the display unit 110.

The sensor unit 130 forwards a user input or an environment recognized by the digital device 100 to the processor 120 by using a plurality of sensors provided in the digital device 100, and may include a plurality of sensing means. However, the sensor unit 130 may be provided selectively depending on design of the digital device 100, and is useful especially when the digital device 100 is the same as the recording device.

Accordingly, the sensor unit 130 may store a surrounding environment of the digital device 100 as image data. Accordingly, the plurality of sensing means may include a sensing means such as an image sensor, a motion sensor, a gyro sensor, an acceleration sensor, an infrared sensor, an inclination sensor, a brightness sensor, an altitude sensor, an audio sensor, a video sensor, a global positioning system (GPS) sensor, and a touch sensor.

In this way, the sensor unit 130 refers to the aforementioned various sensing means, and may sense various inputs of the user and the user's environment and forward the sensed result to the processor 120, whereby the processor 120 may perform the operation based on the sensed result.

The aforementioned sensors may be included in the digital device 100 as separate elements or may be incorporated into at least one or more elements.

The storage unit 140 may store a command and data of the processor 120, and may store various kinds of digital data such as video, audio, photos, moving picture images, and applications. The storage unit 140 includes various digital data storage spaces such as a flash memory, a hard disk drive (HDD), and a solid state drive (SSD).

The digital device 100 according to the present invention may store the image data recorded by the digital device 100 or the image data received from the recording device in the storage unit 140.

The communication unit 150 may transmit and receive data to and from an external device by using various protocols by performing communication with the external device. Also, the communication unit 150 may access an external network through wire or wireless and transmit and receive digital data such as contents to and from the external network. Accordingly, the communication unit 150 may receive the image data together with additional data of the image data from the recording device. Also, the communication unit 150 may use a wireless network to enable pairing with the recording device.

Also, although not shown in FIG. 1, the digital device according to the present invention may further include an audio input and output unit and a power unit.

The audio input and output unit (not shown) may include an audio output means such as a speaker and an earphone and an audio input means such as mike, and may perform audio output of the digital device and audio input to the digital device. At this time, the audio input and output unit may be used as an audio sensor, and may be provided selectively depending on design of the digital device.

The power unit (not shown) is a power source connected with a battery in the digital device or an external power source, and may supply the power to the digital device 100.

The digital device 100 according to the present invention may provide additional information of the image data on a map. This will be described in more detail with reference to FIG. 2 to FIG. 9.

The digital device according to the present invention may acquire at least one image data. In other words, the digital device may record at least one image data through the sensor unit included therein, or may receive at least one image data from a separate recording device through the communication unit included therein.

Hereinafter, for convenience of description, one embodiment that the digital device receives at least one image data from a separate recording device will be described. However, the present invention is not limited to this embodiment, and a case where the recording device is the same as the digital device may equally be applied to the present invention and pertains to the scope of the present invention.

In the meantime, the digital device may receive at least one image data together with additional information of the image data. The additional information may include position information and time information of the recording device when the image data are recorded by the recording device. That is, the position information and the time information of the recording device are corresponding to actual time and location when the image data are recorded by the recording device.

The position information may be global positioning system (GPS) information. Accordingly, when recording the image data, the recording device may detect its position information. Accordingly, the recording device may include a GPS receiver for receiving GPS information.

Also, according to another embodiment of the present invention, the recording device may indirectly detect its position information through a network connected therewith.

Also, the recording device may store its time information as additional information when recording the image data. The time information may be in the form of time stamp, and may be stored as additional information of the image data to approve the time when the image data are generated.

Figure 2:
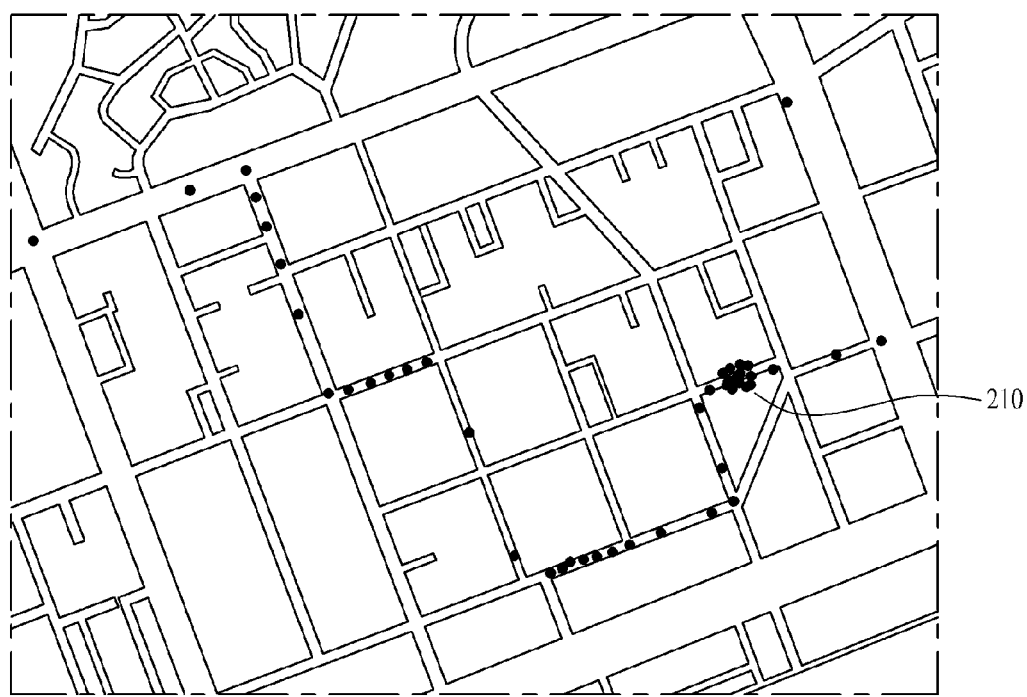
FIG. 2 is a diagram illustrating that a digital device displays a path of user on a map by mapping the path into the map in accordance with one embodiment of the present invention.

FIG. 2 is a diagram illustrating that a digital device displays a path of user on a map by mapping the path into the map in accordance with one embodiment of the present invention.

First of all, as shown in FIG. 2, the digital device may include a graphic image corresponding to electronic map information to display a map. The electronic map information may include a form of a road, a road map, a background map which is a graphic image in the form of vector, for displaying surroundings of the road, and a facility DB storing longitude and latitude coordinates of a facility to search for a specific position by using name and address.

Accordingly, the digital device may store the electronic map information in the storage unit. Also, the digital device may receive required information and updated information from the external device if necessary.

Also, as shown in FIG. 2, the digital device may display the electronic map information together with a location where the image data are recorded, by using the position information of the image data. At this time, if the image data are still images, the digital device may display the location where the image data are recorded, on the map in the form of dot. On the other hand, if the image data are moving picture images, the digital device may display the location where the image data are recorded, in the form of line.

Accordingly, the user may recognize when and where he or she is, by using the position information of the image data displayed on the map. Also, the user may infer its moving path.

However, if the image data are still images, the additional information may further include position information of the recording device, which is acquired at a preset time interval, from the time when the image data are first recorded. This will be described in more detail with reference to FIG. 3.

Figure 3:
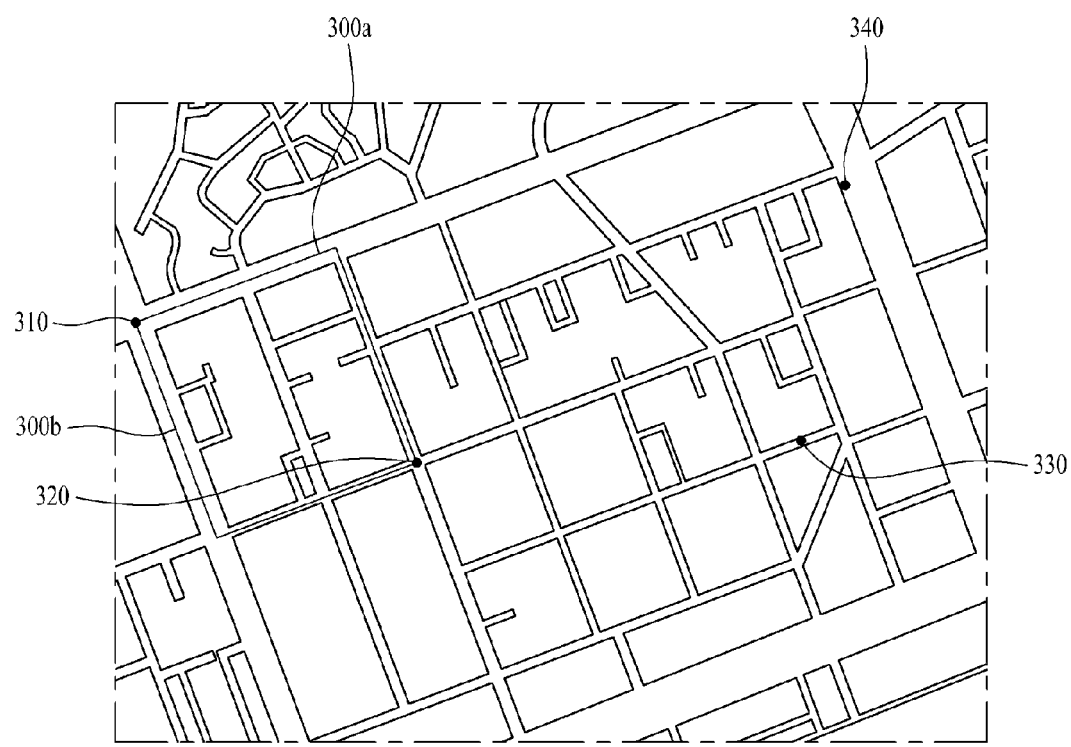
FIG. 3 is a diagram illustrating that a digital device generates path information when image data are still images in accordance with one embodiment of the present invention.

FIG. 3 is a diagram illustrating that a digital device generates path information when image data are still images in accordance with one embodiment of the present invention.

As shown in FIG. 3, it is assumed that the image data are still images and are only recorded at a first location 310, a second location 320, a third location 330 and a fourth location 340. In this case, paths for connecting the respective locations with each other may be generated in various manners.

Accordingly, the digital device may not know the path where the user actually moves, among various paths for connecting the first location 310 with the second location 320, the second location 320 with the third location 330, and the third location 330 with the fourth location 340. In more detail, in case of the first location 310 and the second location 320, a first path 300a and a second path 300b may exist, and the digital device may not know the path where the user has actually moved.

If the image data are still images, the digital device generates path information by connecting the locations where the image data are recorded. However, if the section between the locations where the image data are recorded is wide, a problem occurs in that it is difficult for the digital device to identify the path where the user actually moves, among various paths for connecting the respective locations with each other.

Accordingly, the digital device may generate path information by selecting the path where the user actually moves among several paths, by using the position information of the recording device, which is acquired by a preset time interval. In other words, the recording device may generate its position information as additional information together with additional information associated with the image data by detecting its position information at a given period from the time when the image data are first recorded.

As a result, the digital device may determine the path where the user actually moves, by additionally using the position information of the recording device, which is detected at a given time interval, and may reduce an error of the path information.

Figure 4:
FIG. 4 is a diagram illustrating that a digital device displays path information on a map in accordance with one embodiment of the present invention.

FIG. 4 is a diagram illustrating that a digital device displays path information on a map in accordance with one embodiment of the present invention, and illustrates an example of path information generated using the additional information of FIG. 2.

The path information may include information matching the position information of the recording device with the road on the map through a sequence based on the time information. Accordingly, if locations shown in the form of dots in FIG. 2 are connected with one another through a sequence based on time information of the image data, the path information may be generated. Also, the digital device may display the path on the map in the form of a line 410 as shown in FIG. 4 on the basis of the generated path information.

However, although the moving path of the user may be identified from the line 410 corresponding to the path of FIG. 4, a problem occurs in that information on a path or place in which the user is interested may not be identified.

In other words, although the location where many image data are recorded may be the place where the user's interest is high or many user's memories exist, this information may not be identified from the path of FIG. 4.

Figure 5:
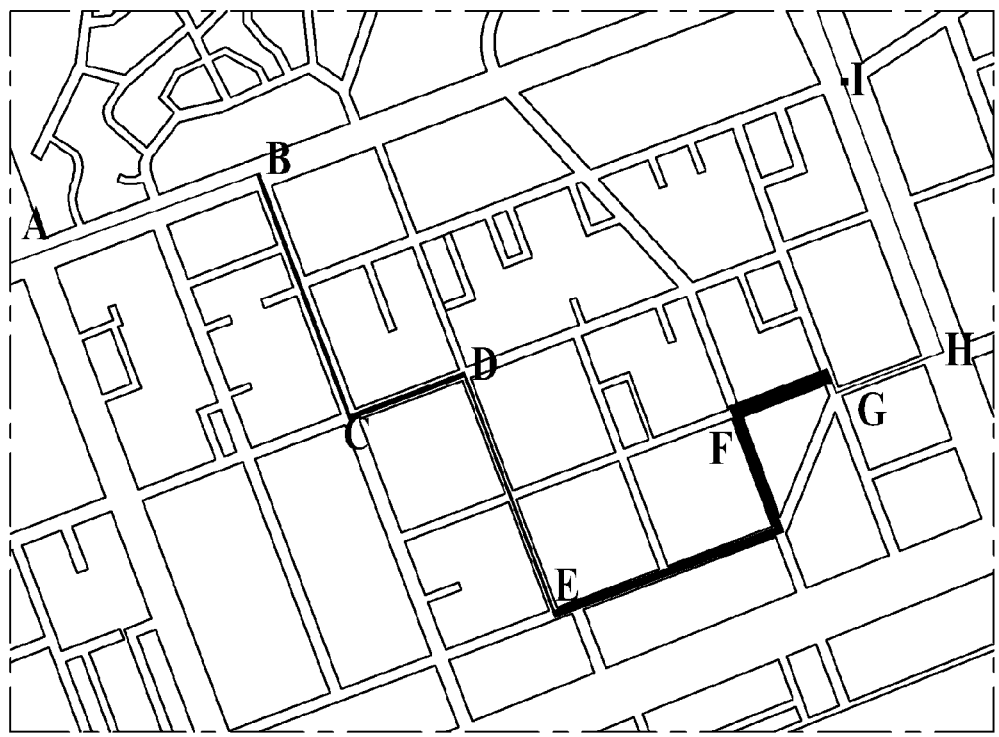
FIG. 5 is a diagram illustrating path information of a user, in which a section of the path is divided in a unit of time in accordance with one embodiment of the present invention.
Figure 6:
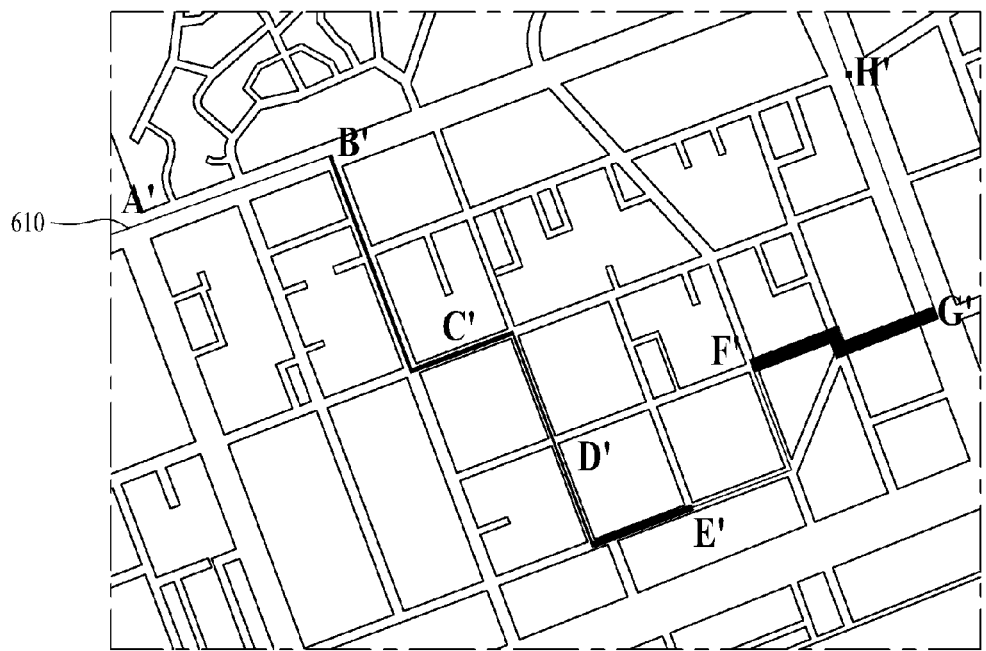
FIG. 6 is a diagram illustrating path information of a user, in which a section of the path is divided in a unit of distance which is previously set in accordance with one embodiment of the present invention.
Figure 7:
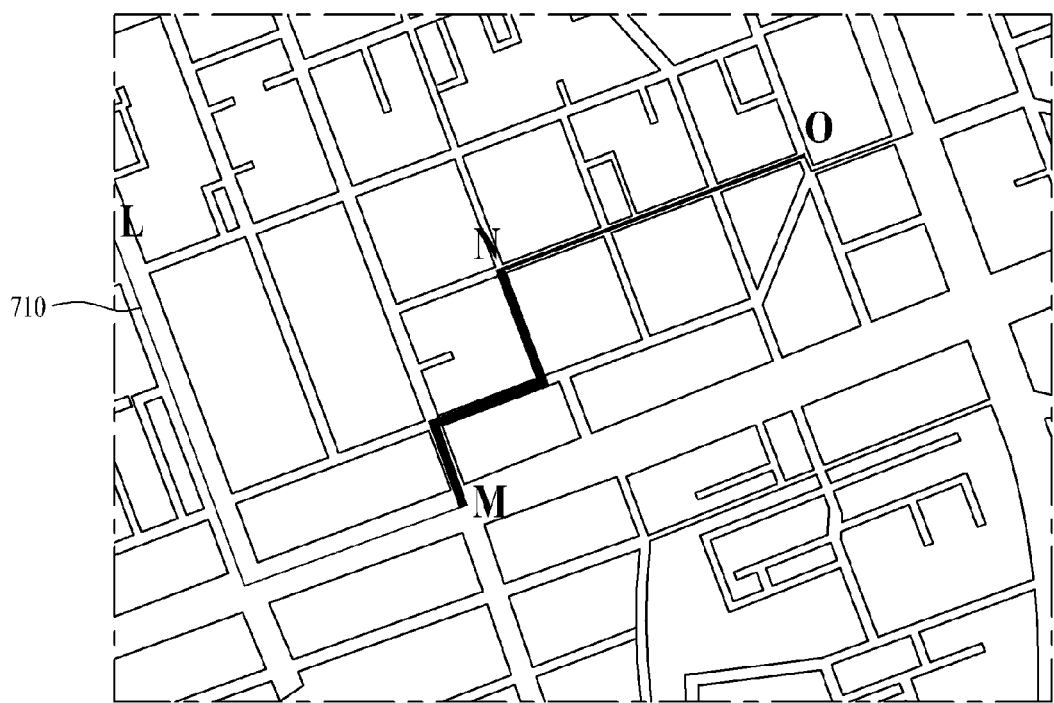
FIG. 7 is a diagram illustrating path information of a user, in which a section of the path is divided to correspond to a distance moved by a recording device in a unit of time in accordance with one embodiment of the present invention.

Accordingly, the present invention is intended to provide path information of the user, which reflects the user's interest level. FIG. 5 to FIG. 7 illustrate path information that reflects the user's interest level, and will be described hereinafter.

Although various methods for identifying the user's interest level may be provided, the present invention is intended to determine the user's interest level on the basis of the amount of the image data included in a given section. At this time, the amount of the image data may be determined by the number of still images included in the corresponding section if the image data are still images, or may be determined by the number of frames included in the corresponding section if the image data are moving picture images.

Accordingly, the digital device may first divide the path into several sections. At this time, if the image data are still images, the digital device may divide the section of the path in a unit of time or distance.

FIG. 5 is a diagram illustrating path information of a user, in which a section of the path is divided in a unit of time in accordance with one embodiment of the present invention. The section of the path, which is divided by the digital device in a unit of time previously set, will be described with reference to FIG. 5. At this time, the unit of time which is previously set may be set to a unit of second, a unit of minute, and a unit of hour in accordance with time information of the recording device.

For example, the digital device sets the fastest time of time information of at least one image data which is acquired, to a start time, and sets the slowest time to an end time. Also, the digital device may divide the time between the start time and the end time into a unit of 15 minutes, a unit of 30 minutes, or a unit of 1 hour. As a result, the digital device may divide the section of the path in accordance with the divided time unit.

In FIG. 4, it is assumed that the user's moving path is divided into a unit of 30 minutes. In this case, the section of the path may be divided into a section A-B, a section B-C, a section C-D, a section D-E, a section E-F, a section F-G, a section G-H, and a section H-I as shown in FIG. 5. Since the user carrying the recording device does not move always at the same speed, the actual length of the section may be varied as shown in FIG. 5 even though the path is divided in a unit of the same time.

Since the amount of the image data included in each section of FIG. 5 corresponds to the number of still image cuts, it corresponds to the number of dots shown in FIG. 2. Accordingly, two cuts exist in the section A-B, five cuts in the section B-C, six cuts in the section C-D, three cuts in the section D-E, eleven cuts in the section E-F, fourteen cuts in the section F-G, two cuts in the section G-H, and two cuts in the section H-I.

At this time, the digital device adjusts a line thickness corresponding to the section in accordance with the amount of the image data corresponding to the section of the path. In other words, if the amount of the image data is more than a reference amount within the divided section, the digital device may display a line thickness of the divided section more thickly than a reference thickness. Also, if the amount of the image data is less than the reference amount within the divided section, the digital device may display the line thickness of the divided section more thinly than a reference thickness.

At this time, the reference amount of the image data may be varied depending on the amount of the image data corresponding to the sections. For example, the digital device may set the reference amount of the image data to an average value or intermediate value of the image data corresponding to the sections.

Also, the digital device may set a level of the amount of the image data by setting a range in accordance with the reference amount. Accordingly, the digital device may determine a corresponding level in accordance with the range to which the amount of the image data belongs, and may adjust a line thickness of the corresponding section in accordance with the determined level.

Also, if the reference amount of the image data is set, the digital device may set a reference thickness corresponding to the reference amount. Accordingly, the digital device may set the line thickness more thickly or more thinly than the reference thickness in accordance with the level determined by the amount of the image data.

Referring to FIG. 5, the digital device may set the reference amount of the image data to six cuts. Accordingly, the digital device may set the thickness of the section C-D to the reference thickness. At this time, since the reference amount of the image data is six cuts, the digital device may set three levels downwardly and two levels upwardly. Also, the digital device may set the thickness level to three levels downwardly and two levels upwardly on the basis of the reference thickness.

Accordingly, as shown in FIG. 5, the section A-B may be displayed at a thickness of 1/4 of the reference thickness, the section B-C at a thickness of 3/4 of the reference thickness, the section C-D at the reference thickness, the section D-E at a thickness of 2/4 of the reference thickness, the section E-F at a thickness of 7/4 of the reference thickness, the section F-G at a thickness of 8/4 of the reference thickness, and the section G-H and the section H-I at a thickness of 1/4 of the reference thickness.

As described above, the digital device according to the present invention is advantageous in that it may provide the user's interest level by displaying the thickness of the path per section differently to correspond to the amount of the image data. In other words, the user may determine the section where the line thickness corresponding to the path is thick, as the section where the user's interest level is high, and may determine the section where the line thickness corresponding to the path is thin, as the section where the user's interest level is low.

FIG. 6 is a diagram illustrating path information of a user, in which a section of the path is divided in a unit of distance in accordance with one embodiment of the present invention. The section of the path, which is divided by the digital device in a unit of distance, will be described with reference to FIG. 6. At this time, the unit of distance may mean that the path is divided from the generated path information at the same distance, and all the sections may be set to the same distance.

Referring to FIG. 6, if a line 610 of the path is divided in a unit of the same distance, a section A'-B', a section B'-C', a section C'-D', a section D'-E', a section E'-F', a section F'-G', and a section G'-H' are set.

The amount of the image data included in each section of FIG. 6 corresponds to the number of still image cuts in the same manner as FIG. 5. Accordingly, the amount of the image data included in each section corresponds to the number of dots shown in FIG. 2. As a result, the digital device may adjust a line thickness in accordance with the amount of the image data.

In other words, if the amount of the image data included in the section is more than a reference amount, the digital device may display the line thickness more thickly than a reference thickness. Also, if the amount of the image data included in the section is less than the reference amount, the digital device may display the line thickness more thinly than a reference thickness. At this time, since the reference amount and reference thickness are the same those described in FIG. 5, their detailed description will be omitted.

The case where the image data are still images has been described as one embodiment in FIG. 2 to FIG. 6. Hereinafter, the case where the image data are moving picture images will be described with reference to FIG. 7 and FIG. 8.

As described above, the digital device may divide a line of a path into one or more sections to display a path which reflects the user's interest level. At this time, if the image data are moving picture images, the digital device may divide the line of the path in a unit of time, which is previously set, to correspond to the distance moved by the recording device, or may divide the line of the path to correspond to a moving speed of the recording device.

FIG. 7 is a diagram illustrating path information of a user, in which a section of the path is divided to correspond to a distance moved by a recording device in a unit of time which is previously set in accordance with one embodiment of the present invention. The case where the section of the path is divided to correspond to the distance moved by the recording device in a unit of time which is previously set will be described with reference to FIG. 7. At this time, it is assumed that the previously set time is 20 minutes.

In FIG. 7, the recording device has been moved from a location L to a location M for 20 minutes from the time when recording starts. The recording device has been moved from a location M to a location N for next 20 minutes and from a location N to a location O for next 20 minutes.

In this way, the digital device may divide the sections L-M, M-N and N-O to correspond to the distance moved by the recording device in a unit of time.

Also, if the moving distance of the recording device per section is shorter than the reference distance, the digital device may display the line thickness more thickly than the reference thickness. If the moving distance of the recording device per section is longer than the reference distance, the digital device may display the line thickness more thinly than the reference thickness.

Supposing that the distance of the section N-O is the reference distance, the section L-M is longer than the reference distance. Accordingly, the digital device displays the line thickness of the section L-M more thinly than the line thickness of the section N-O. Also, the section M-N is shorter than the reference distance. Accordingly, the digital device displays the line thickness of the section M-N more thickly than the line thickness of the section N-O.

As described above, the section of the path has been divided to correspond to the distance moved for the same time. Also, since the moving picture images have the same number of frames for the same time, the amount of the image data included in the sections is same. However, the amount of the image data corresponding to the same distance within the section is respectively different. That is, the amount of the image data per distance within the section where the line thickness is displayed thickly is more than that within the section where the line thickness is displayed thinly.

For example, supposing that the section L-M is 100 meters and the section M-N is 25 meters, since the section L-M and the section M-N have been divided in a unit of the same time, the number of frames included in the image data is 200 in the sections L-M and M-N. However, in case of the number of frames corresponding to 1 meter within each section, the section L-M has two frames, and the section M-N has eight frames. In other words, the amount of the image data per distance within the section M-N is more than that within the section L-M.

Accordingly, if the line thickness of the section is thick, the amount of the image data corresponding to the distance within the section is large. Also, if the line thickness of the section is thin, the amount of the image data corresponding to the distance within the section is small. In this way, since the line thickness of each section is proportional to the amount of the image data as compared with the distance unit within the section, the user may easily infer the amount of the image data corresponding to the distance within the section from the thickness of section.

As a result, the user may identify how long the user has moved for the same time, from the length of the section, and may also identify the amount of the image data from the thickness of the section by intuition.

Figure 8:
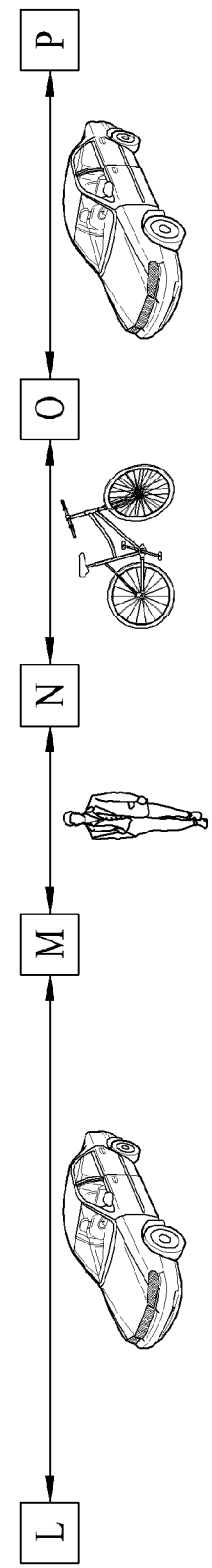
FIG. 8 is a diagram illustrating path information of a user, in which a section of the path is divided to correspond to a moving speed of a recording device in accordance with one embodiment of the present invention.

FIG. 8 is a diagram illustrating path information of a user, in which a section of the path is divided to correspond to a moving speed of a recording device in accordance with one embodiment of the present invention. The case where the digital device divides the section of the path to correspond to the moving speed of the recording device will be described with reference to FIG. 8.

If the user moves thorough a car, since a speed of the car is fast, the time when the user is interested in a specific place is short. By contrast, if the user walks, since a speed of the user is slow, the time when the user is interested in a specific place is long.

Accordingly, the digital device according to the present invention is intended to provide information on the user's interest section by dividing the section of the path to correspond to the moving speed of the recording device and adjusting the line thickness of the path.

In more detail, the digital device may display the line thickness more thickly than the reference thickness if the moving speed of the recording device is slower than the reference speed. Also, the digital device may display the line thickness more thinly than the reference thickness if the moving speed of the recording device is faster than the reference speed.

At this time, the digital device may set the reference speed in various manners. For example, the digital device may set an average speed from the time when the recording device starts recording to the time when the recording device ends recording, as the reference speed. Alternatively, the digital device may divide a speed into one or more levels so as to set the speed of the level where the most time is required for the reference speed.

Accordingly, as shown in FIG. 8, it may be inferred that the user moves the section L-M through a car, walks for the section M-N, moves the section N-O by bike, and moves the section O-P through a car. In this case, the line thickness corresponding to the path of FIG. 8 may be displayed by being controlled in inverse proportion to the moving speed.

For example, it is assumed that the section of the path 710 of FIG. 7 is divided to correspond to the moving speed of the recording device. In this case, supposing that the thickness of the section M-N is the reference thickness, the thickness of the section L-M is displayed more thinly than the reference thickness and the thickness of the section N-O is displayed more thickly than the reference thickness. Accordingly, it is noted that the user has moved for the section L-M faster than the section M-N and moved for the section N-O slower than the section M-N.

Accordingly, it is noted that the user's interest level is lower and the moving speed is faster for the section L-M than the section N-O and the user's interest level is higher and the moving speed is slower for the section M-N than the section N-O. In other words, the user may infer its moving speed from the line thickness and identify his/her interest level from the line thickness by intuition.

Figure 9:
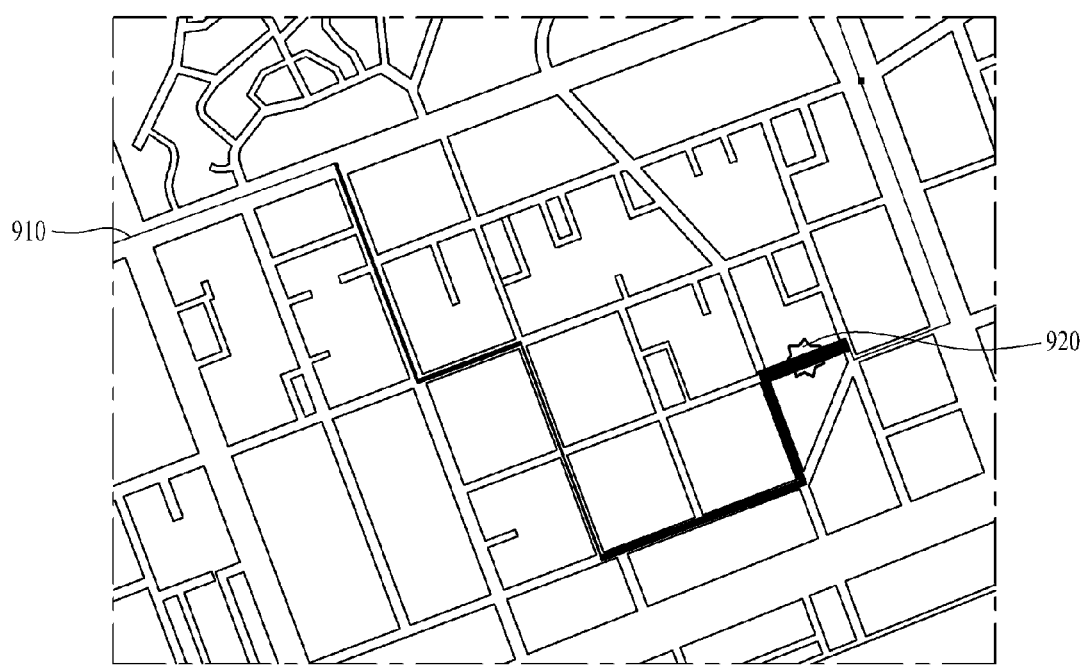
FIG. 9 is a diagram illustrating an identification mark for a section of a path in accordance with one embodiment of the present invention.

In the meantime, FIG. 9 is a diagram illustrating an identification mark for a section of a path in accordance with one embodiment of the present invention. In FIG. 9, the path of the user is displayed by a line 910 in accordance with additional information of the image data shown in FIG. 2.

In FIG. 2, the amount of mapped image data is large in a specific location 210. In particular, if the section of the path is divided in a unit of time as shown in FIG. 5, the section F-G corresponding to the specific location 210 has a short path length and a thick line. Accordingly, for the section F-G, it may be inferred that the user has entered a building or spent much time within a specific area and has performed recording many times.

As described above, if the length of the divided section is shorter than the reference which is previously set, and if the amount of the image data mapped into the divided section is more than the reference which is previously set, the digital device may display an identification mark 920 to identify the corresponding section from the other sections.

The digital device may use the length of the divided section and the amount of the image data mapped into the section as the reference for displaying the identification mark 920. For example, if the section of the path is 100 meters as the actual distance or 1 cm as the length of the section displayed on the map, the digital device may set the corresponding section as a target for displaying the identification mark. At the same time, if the image data included in the corresponding section are more than 20 cuts, the digital device may determine the corresponding section as the target for displaying the identification mark.

However, the length of the section determined by the digital device as the target for displaying the identification mark and the reference for the amount of the image data mapped into the section may be varied depending on the set value.

Also, the identification mark may include at least one thumbnail. In FIG. 9, the digital device displays the identification mark 920 in the form of icon. However, since the amount of the image data mapped into the section where the identification mark is displayed is large, the digital device may display the identification mark in the form of thumbnail, whereby the user may easily identify a place related to the identification mark.

Accordingly, if a preview request signal is received from the user with respect to the identification mark, the digital device may display the image data mapped into the section which includes the identification mark. Since time information is included in the additional information of the image data, the digital device may provide image data through a sequence based on the time information.

Also, the preview request signal received by the digital device from the user is the signal received through a user interface when the user desires to view image data or thumbnail corresponding to the image data.

The preview request signal may be generated in various forms without being limited to a specific form. For example, the preview request signal may be generated when the user touches the identification mark 920.

Figure 10:
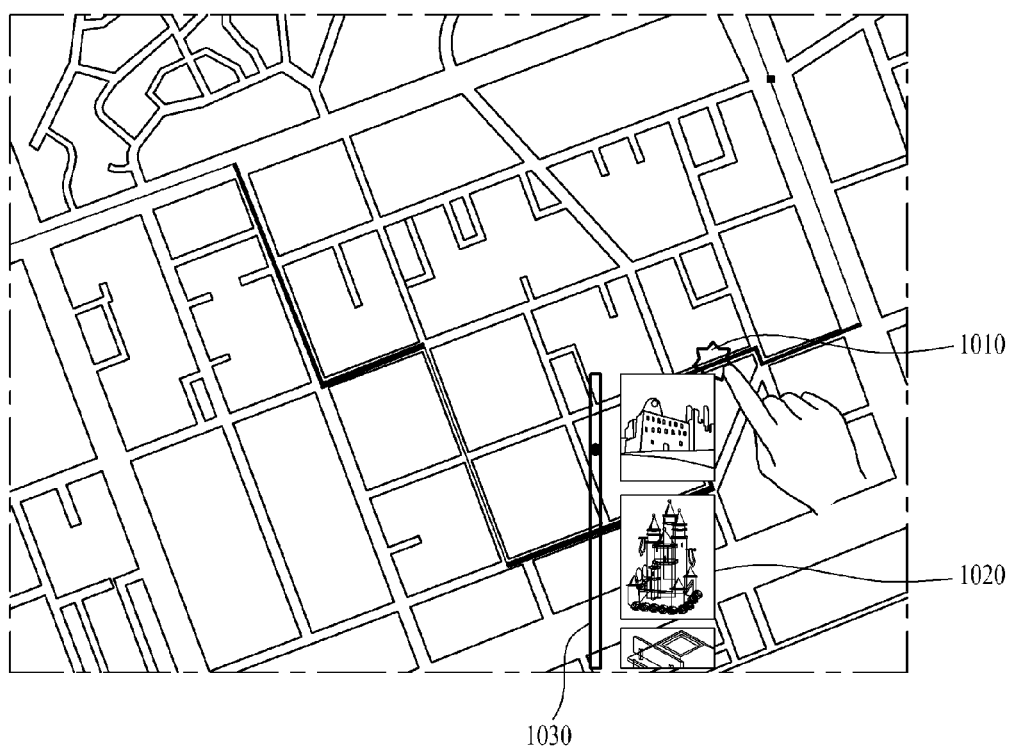
FIG. 10 is a diagram illustrating that a digital device provides a thumbnail by using an identification mark in accordance with one embodiment of the present invention.

FIG. 10 is a diagram illustrating that a digital device provides a thumbnail by using an identification mark in accordance with one embodiment of the present invention.

If a preview request signal is received with respect to an identification mark 1010, the digital device may provide a thumbnail list 1020. If a plurality of thumbnails are provided and displayed at the same time, the map may be covered with the thumbnails, whereby the user may feel inconvenience.

Accordingly, the digital device may provide a control bar 1030 to allow the user to easily view a thumbnail list 1030 of image data. Alternatively, the digital device may display the thumbnail list of the image data through zoom-in to allow the user to well view the thumbnail list.

Figure 11:
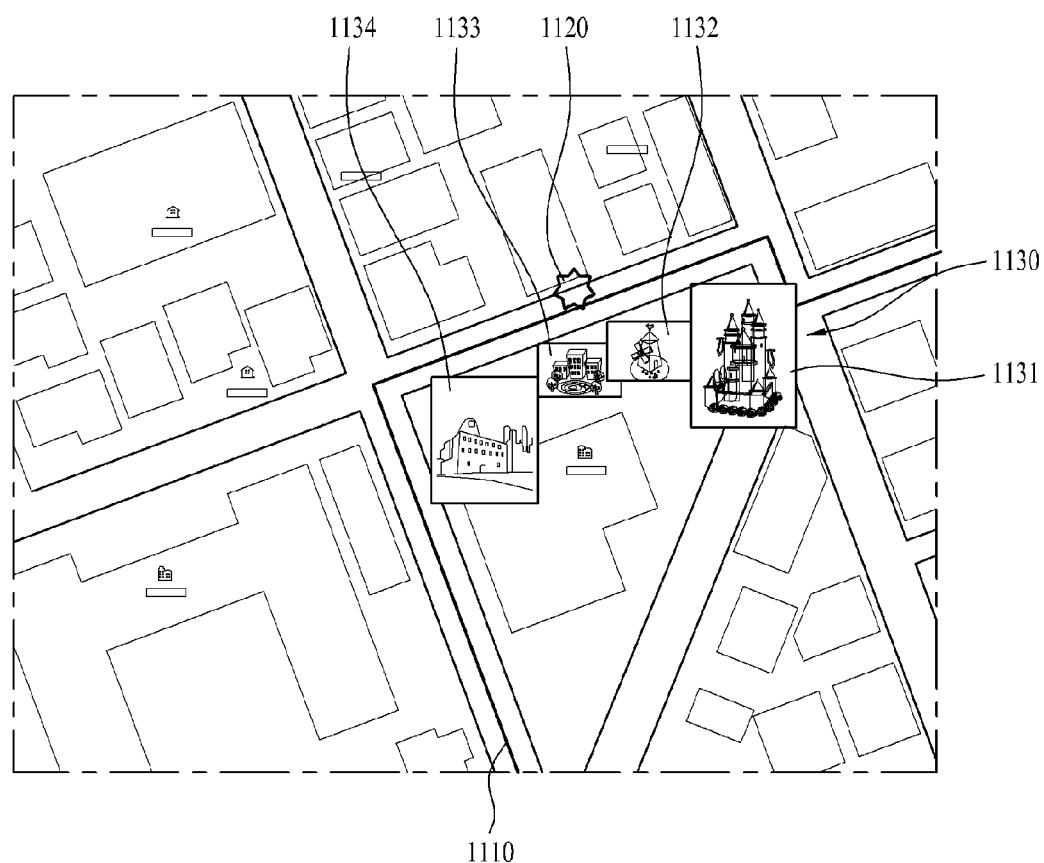
FIG. 11 is a diagram illustrating an example of a user interface provided when a digital device receives a preview request signal for an identification mark in accordance with one embodiment of the present invention.

FIG. 11 is a diagram illustrating an example of a user interface provided when a digital device receives a preview request signal for an identification mark in accordance with one embodiment of the present invention.

If the preview request signal for the identification mark 1010 of FIG. 10 is received through a user interface, the digital device may display the map through zoom-in as shown in FIG. 11.

As a result, in case of a path 1110 displayed by a line, the path corresponding to an area of the zoom-in map is only displayed. Also, the digital device may display a thumbnail list 1130 while displaying an identification mark 1120. At this time, the digital device may display the thumbnail list 1130 by identifying main thumbnails 1131 and 1134 from general thumbnails 1132 and 1133. This will be described again with reference to FIG. 13 to FIG. 15.

Figure 12:
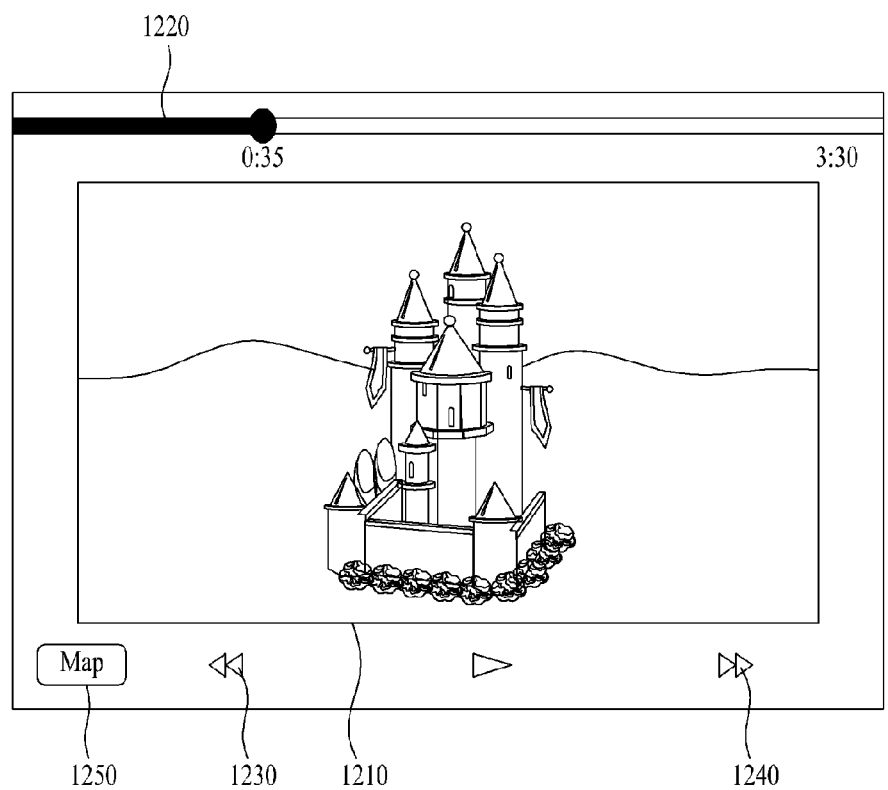
FIG. 12 is a diagram illustrating another example of a user interface provided when a digital device receives a preview request signal for an identification mark in accordance with one embodiment of the present invention.

FIG. 12 is a diagram illustrating another example of a user interface provided when a digital device receives a preview request signal for an identification mark in accordance with one embodiment of the present invention.

If the preview request signal for the identification mark 1010 of FIG. 10 is received from the user, the digital device may display image data mapped into the section that includes the identification mark as shown in FIG. 12.

Accordingly, the digital device may provide image data 1210 by providing a player for playing image data on a map as shown in FIG. 12.

If the mapped image data are moving picture images, the digital device may provide a full play time and a current play time through a time progress bar 1220. Also, the digital device may provide next play menu 1240 and a previous play menu 1230 together to allow the user to conveniently play the moving picture images.

Also, if the mapped image data are still images, the digital device may provide the image data sequentially in accordance with a time sequence by using time information of the image data.

Accordingly, if the next play menu 1240 is selected, the digital device may display image data recorded after the image data which is being currently played. If the previous play menu 1230 is selected, the digital device may display image data recorded before the image data which is being currently played.

Also, the digital device may provide a map where the path is displayed, at any time if the user desires to do, by separately providing a map menu 1250.

The embodiment that the path information of the user is generated using additional information of the image data to display the path information together with a map has been described as above. However, the user may desire to view image data recorded through its moving path on a map together with the moving path.

Accordingly, the digital device may provide a thumbnail of the image data together with a path of user on the map. At this time, if the image data are still images, the thumbnail may be a downsized cut of the still images. If the image data are moving picture images, the thumbnail may be a downsized cut of a specific frame of the moving picture images.

Figure 13:
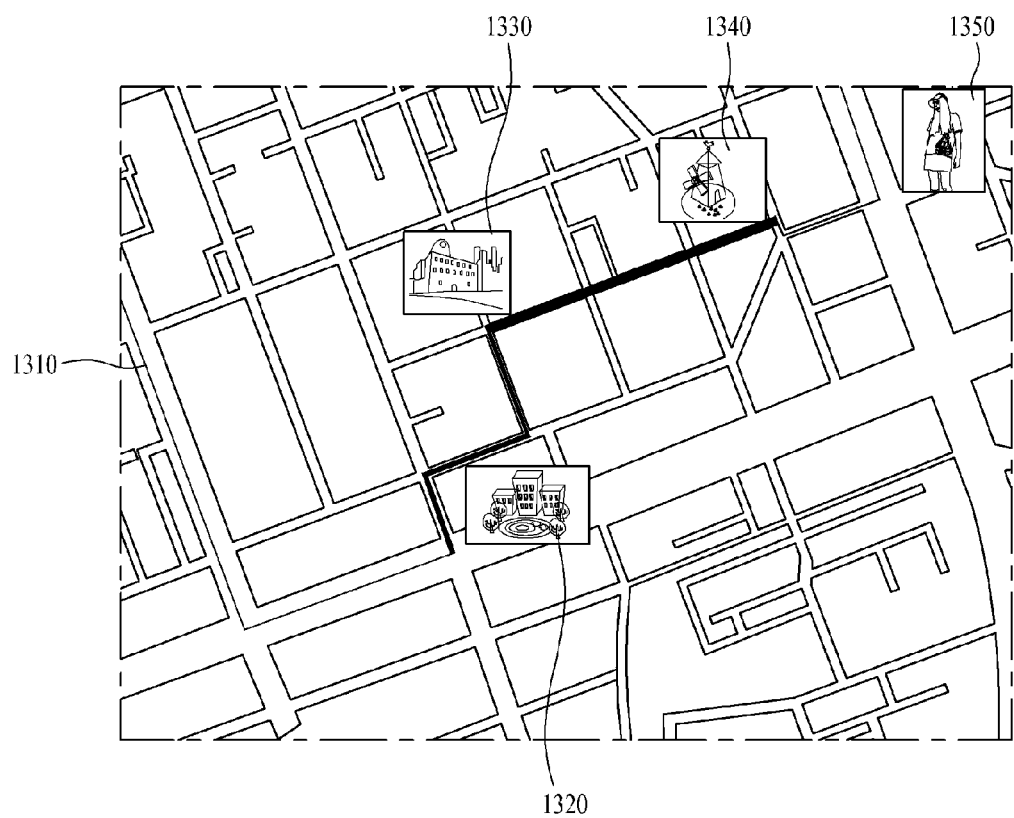
FIG. 13 is a diagram illustrating that a digital device provides a thumbnail together with a path of user in accordance with one embodiment of the present invention.

FIG. 13 is a diagram illustrating that a digital device provides a thumbnail together with a path of user in accordance with one embodiment of the present invention.

As shown in FIG. 13, the digital device may display a path 1310 along path information generated using position information and time information of the image data. Also, as described above, the digital device may display the path by adjusting the line thickness in accordance with the amount of the image data included in each section of the path. As a result, the user may easily identify the section where the user stays for a long time, the section where many image data are recorded, etc.

At this time, the digital device may provide main thumbnails 1320, 1330, 1340 and 1350 representative of each section, together with the path. The main thumbnails may be extracted by various references and methods.

However, since an object of the present invention is to provide a path that reflects the user's interest level, the digital device according to the present invention may extract the thumbnail in which the user is highly interested, as the main thumbnail.

Accordingly, the digital device may extract the main thumbnail in accordance with the moving speed when the recording device records the image data and the amount of the recorded image data. This will be described in detail with reference to FIG. 14.

Figure 14:
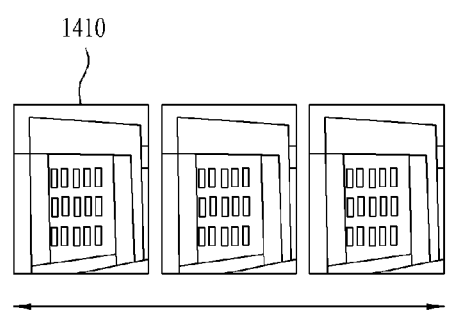
FIG. 14 is a diagram illustrating that a digital device extracts a main thumbnail in accordance with one embodiment of the present invention.
Figure 14:
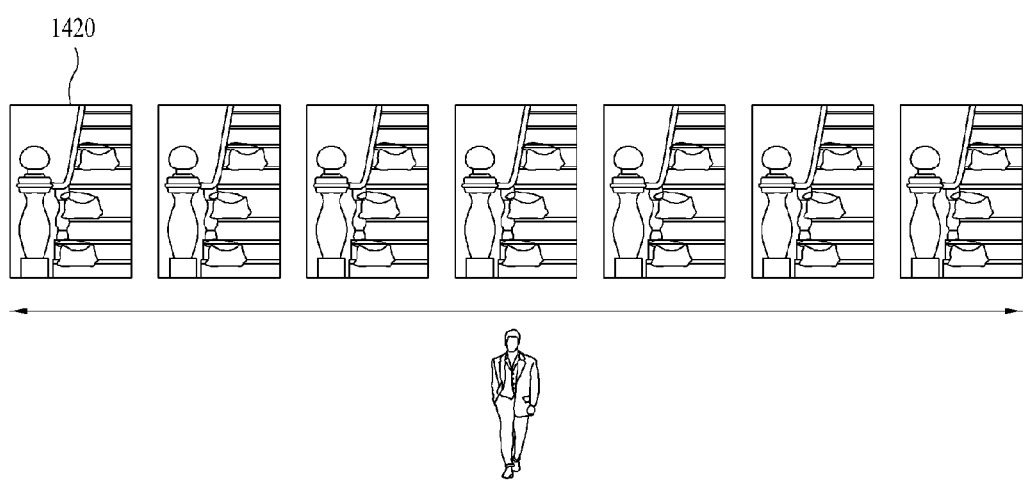

FIG. 14 is a diagram illustrating that a digital device extracts a main thumbnail in accordance with one embodiment of the present invention.

The user keeps his/her eyes on a target in which the user is highly interested, for a longer time than any other things. Accordingly, if the image data are moving picture images, the number of frames for a specific image may be more increased than that of frames for the other images. Also, if the image data are still images, since the corresponding image has been recorded many times, many cuts for the specific image may exist.

Accordingly, if specific image data image data exist continuously in image data of a preset amount, the specific image data may be regarded that the user's interest is high, whereby the digital device may extract the specific image data as main thumbnails.

However, for the case where the user watches specific images 1410 while moving through a car as shown in (a) of FIG. 14, and the case where the user watches specific images 1420 while waking as shown in (b) of FIG. 14, although the amounts of the specific image data are different from each other, the digital device may extract the corresponding images for both cases as main thumbnails. This is because that the moving speed of the user is different in both cases.

The number of specific images 1410 continuously existing in (a) of FIG. 14 is smaller than that of specific images 1420 continuously existing in (b) of FIG. 14. However, when the user moves through a car, the user fails to keep his/her eyes on a specific image for a long time due to fast speed of the car.

Accordingly, considering the moving speed of the user, it may not be regarded that the interest level for the specific images 1410 in (a) of FIG. 14 is smaller than the interest level for the specific images 1420 in (b) of FIG. 14.

In this respect, if the specific image data of previously set image data exist continuously, the digital device may extract the specific image data as main thumbnails. However, in this case, the previously set image data may be determined depending on the moving speed of the recording device.

As shown in (a) of FIG. 14, if the user moves through a car and the moving speed of the recording device is more than 50 km/m, even though at least three frames exist continuously, the digital device may extract the frames as main thumbnails. On the other hand, as shown in (b) of FIG. 14, if the user walks and the moving speed of the recording device is less than 50 km/m, the digital device may extract corresponding frames as main thumbnails only if at least seven frames exist continuously.

Also, the digital device may determine whether the image data existing continuously are the same as one another, through image processing such as image matching. In other words, the digital device may determine whether the image data are the same as one another by comparing the image data with one another through image matching, etc. This method is useful especially when the image data are still images.

Also, the digital device may determine whether the image data existing continuously are the same as one another, by using position information, panning angle information, tilting angle information and altitude information of the recording device. If the image data have the same panning angle, tilting angle and altitude angle at the same position, the image data may be regarded as the same images as one another. Even though the position of the image data is shifted, if a panning angle and a tilting angle are shifted to correspond to the shifted position of the image data, it may be regarded that the same image data are recorded. This method is useful especially when the image data are moving picture images.

However, at this time, the aforementioned additional information may further include panning angle information, tilting angle information and altitude information, which correspond to the time when the recording image data records the image data.

In the meantime, the digital device may display main thumbnails to be identified from the other thumbnails. This will be described again with reference to FIG. 15.

Figure 15:
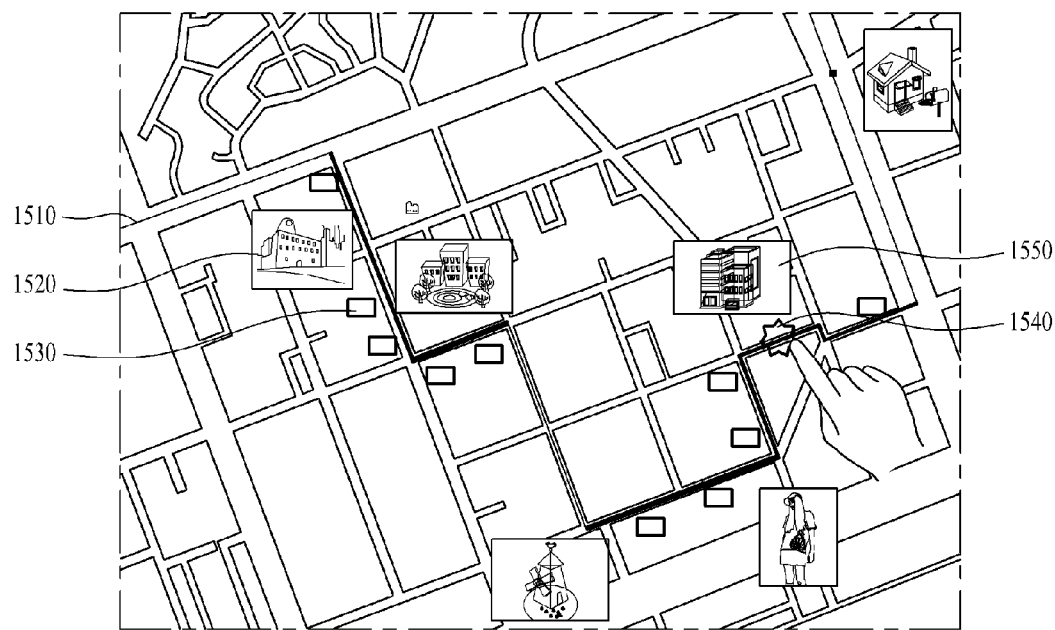
FIG. 15 is a diagram illustrating that a digital device displays main thumbnails differently from general thumbnails in accordance with one embodiment of the present invention.

FIG. 15 is a diagram illustrating that a digital device displays main thumbnails differently from general thumbnails in accordance with one embodiment of the present invention.

Referring to FIG. 15, the digital device may display a path 1510 on the basis of path information corresponding to image data. At this time, the digital device may display thumbnails 1520 and 1530 of the image data existing on the path 1510 together with the path 1510.

However, as described above, the digital device may extract a specific image for which the user's interest level is high, as a main thumbnail. Accordingly, the digital device may display the main thumbnail 1520 at a size greater than that of a general thumbnail.

Unlike FIG. 15, the digital device may display the main thumbnail by modifying color, chroma, etc. In other words, the digital device may display the main thumbnail through various types of graphic effects to enable the main thumbnail to be identified from the general thumbnail.

Also, as described above, the digital device may display a thumbnail 1550 corresponding to an identification mark 1540 while displaying the identification mark 1540. In particular, as the user records image data inside a specific building, if the identification mark 1540 is set for the specific building, the thumbnail 1550 may be the image for the specific building. In this case, it is advantageous in that the user may easily recall what image data included in the identification mark is about.

Figure 16:
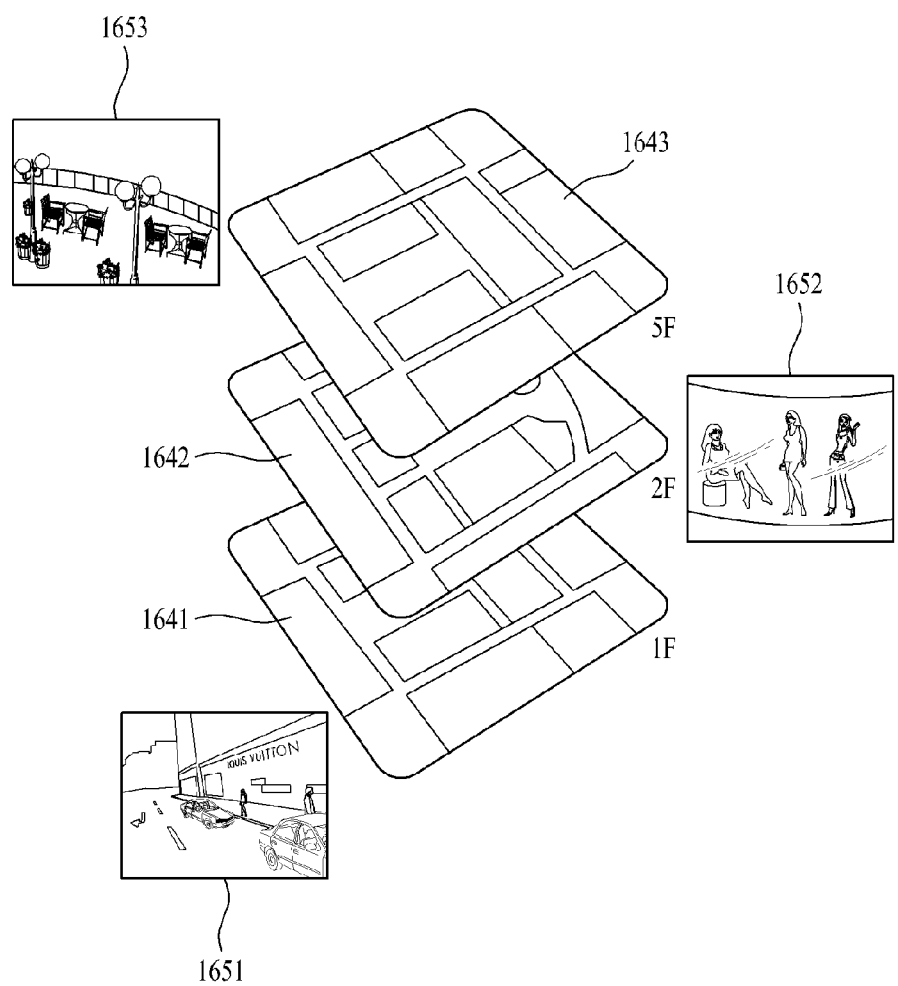
FIG. 16 is a diagram illustrating a user interface provided when a digital device receives a preview request signal for an identification mark shown in FIG. 15 in accordance with one embodiment of the present invention.

FIG. 16 is a diagram illustrating a user interface provided when a digital device receives a preview request signal for an identification mark shown in FIG. 15 in accordance with one embodiment of the present invention.

In FIG. 15, it is assumed that the identification mark 1540 is set for the specific building and image data corresponding to the corresponding section are recorded inside the specific building.

Accordingly, if a preview request signal for the identification mark 1540 is received from the user as shown in FIG. 16, the digital device may provide a user interface that includes floor maps 1641, 1642 and 1643 and main thumbnails 1651, 1652 and 1653 corresponding to the respective floors.

At this time, the digital device may provide maps and main thumbnails for only floors where the user records image data without providing a map and a main thumbnail for a floor where the image data are not recorded, whereby user convenience may be increased.

Figure 17:
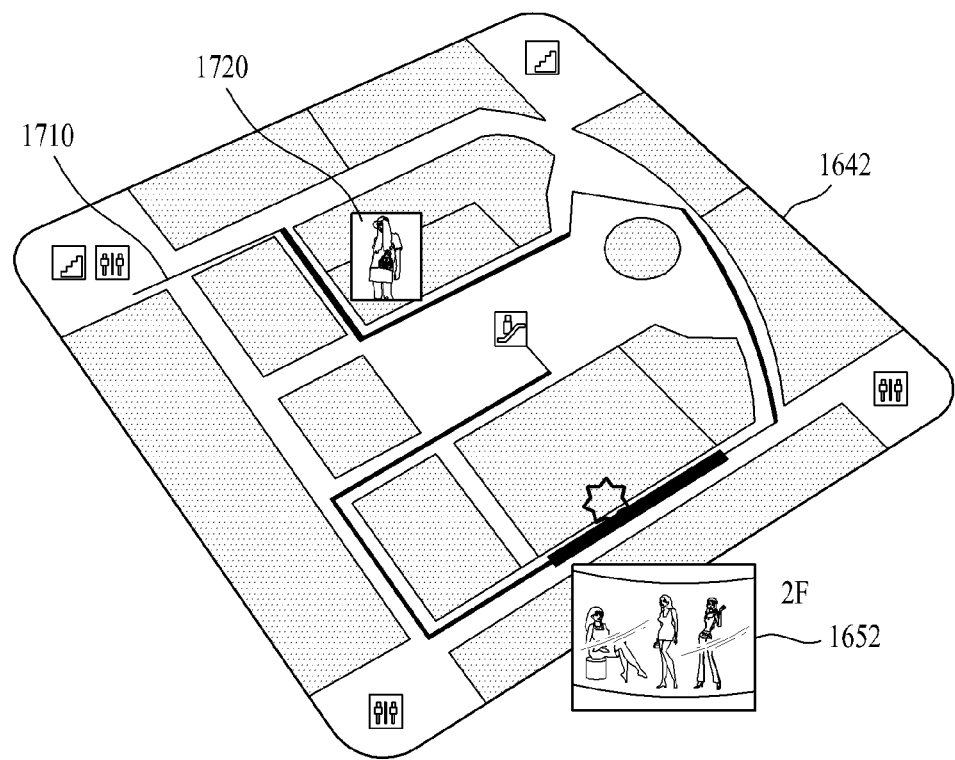
FIG. 17 is a diagram illustrating a user interface provided when a digital device receives a selection signal for floor maps shown in FIG. 16 in accordance with one embodiment of the present invention.

FIG. 17 is a diagram illustrating a user interface provided when a digital device receives a selection signal for floor maps shown in FIG. 16 in accordance with one embodiment of the present invention.

For the floor maps shown in FIG. 16, the user may select specific main thumbnails 1651, 1652 and 1653 or specific floor maps 1641, 1642 and 1643. In this case, the digital device may display the floor map 1642 and the main thumbnail 1652, which are selected to correspond to a selection signal of the user.

At this time, the digital device may provide the selected floor map 1642 with a moving path 1710 of the user and a thumbnail 1720 for image data of a corresponding floor on the basis of position information and time information of the image data. At this time, the digital device may display the moving path 1710 by adjusting a line thickness corresponding to the moving path 1710, thereby reflecting the user's interest level. Accordingly, it is advantageous in that the user may easily find the moving path and a position of a shop in which the user is interested, at a corresponding floor.

Figure 18:
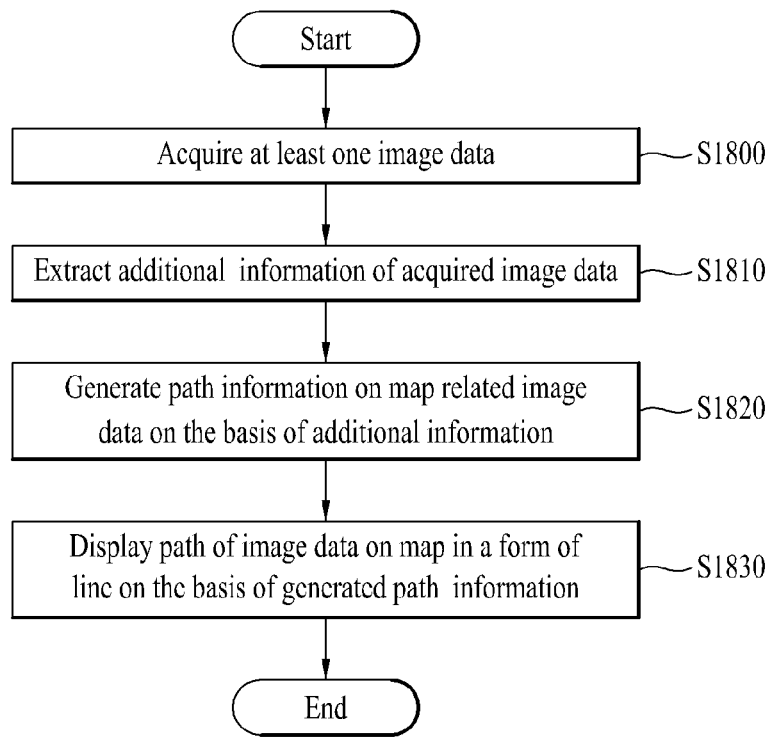
FIG. 18 is a flow chart illustrating a method for controlling a digital device according to one embodiment of the present invention.

FIG. 18 is a flow chart illustrating a method for controlling a digital device according to one embodiment of the present invention.

First of all, the digital device may acquire at least one image data (S1800). The digital device may acquire at least one image from an external recording device through a wire and wireless network. Also, if the digital device is the same as the recording device, it may acquire at least one image data stored in the storage unit.

As described with reference to FIG. 2, the digital device may extract additional information of the acquired image data (S1810). The additional information may include position information and time information of the recording device corresponding to actual time and location when the image data are recorded by the recording device.

Also, as described with reference to FIG. 14, the additional information may include direction information (for example, panning angle information, tilting angle information and altitude information) of the corresponding recording device corresponding to actual time and location when the image data are recorded by the recording device, if necessary.

Also, as described with reference to FIG. 3, if the image data are still images, the additional information may further include position information of the recording device, which is acquired by a preset time interval.

Also, as described with reference to FIG. 4, the digital device may generate path information on a map related to the image data on the basis of the additional information (S1820), and may display a path on the image data on the map in a form of line (S1830).

At this time, as described with reference to FIG. 5 to FIG. 7, the digital device may adjust the line thickness corresponding to the section in accordance with the amount of the image data included in the section of the path. As a result, the user may easily identify the section in which the user is interested or the section where many image data are recorded, from the thickness.

At this time, if the image data are still images, as described with reference to FIG. 5 and FIG. 6, the digital device may divide the section of the path in a preset time or distance.

Also, if the image data are moving picture images, as described with reference to FIG. 8, the digital device may divide the section of the path to correspond to the moving speed of the recording device, or may divide the section of the path to correspond to the distance moved by the recording device during a preset time, as described with reference to FIG. 7.

As described above, the digital device according to the present invention may generate the path by using the image data and provide the generated path to the map together with the image data, and may adjust the line thickness corresponding to the path by reflecting the user's interest level in accordance with the amount of the image data. Accordingly, since the digital device according to the present invention may store and provide life log of the user by reflecting the user's interest level, the life log of the user may be displayed effectively.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present invention.

The digital device and the method for controlling the same according to the present invention are not limited to the aforementioned embodiments, and all or some of the aforementioned embodiments may selectively be configured in combination so that various modifications may be made in the aforementioned embodiments.

In the meantime, the method for controlling the digital device according to the present invention may be implemented in a recording medium, which can be read by a processor provided in the network device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

What is claimed is:

1. A method for controlling a digital device, the method comprising the steps of:
    acquiring at least one image data, wherein the image data includes a still image or moving picture image;
    extracting additional information of the acquired image data, wherein the additional information includes position information and time information of a recording device corresponding to actual time and location when the image data are recorded by the recording device;
    generating path information on a map related to the image data, on the basis of the additional information; and
    displaying a path of the image data on the map in a form of line on the basis of the generated path information,
    wherein the step of displaying the path includes dividing the path into one or more sections, and adjusting line thickness of the divided sections in accordance with amount of the image data according to a distance within a divided section.

2. The method of claim 1, wherein the step of adjusting the line thickness of the divided sections includes displaying the line thickness of the divided sections more thickly than a reference thickness if the amount of the image data corresponding to the distance is more than a reference amount within the divided section, and displaying the line thickness of the divided sections more thinly than the reference thickness if the amount of the image data corresponding to the distance is less than the reference amount within the divided section.

3. The method of claim 1, wherein the step of dividing the sections of the path includes dividing the sections of the path in a preset time or distance, if the image data is a still image.

4. The method of claim 1, wherein the step of dividing the sections of the path includes dividing the sections of the path to correspond to either a moving speed of the recording device or a distance moved by the recording device during a preset time if the image data is a moving picture image.

5. The method of claim 4, wherein the step of adjusting the line thickness of the divided sections includes displaying the line thickness more thickly than a reference thickness if the moving speed of the recording device is slower than a reference speed within the divided section, and displaying the line thickness more thinly than the reference thickness if the moving speed of the recording device is faster than the reference speed within the divided section, if the image data is a moving picture image.

6. The method of claim 5, wherein the reference speed includes an average speed or intermediate speed of the moving speed of the recording device while the image data are being recorded.

7. The method of claim 1, wherein additional information further includes position information of the recording device, which is acquired by a preset time interval, if the image data is a still image.

8. The method of claim 7, wherein the path information includes information matching the position information of the recording device to road information on the map according to a sequence based on the time information.

9. The method of claim 1, further comprising the step of displaying an identification mark to identify a specific section from other sections if the specific section has a length shorter than a reference length and an amount of the image data mapped into the specific section is more than a reference amount.

10. The method of claim 9, wherein the identification mark includes at least one thumbnail.

11. The method of claim 9, further comprising the steps of receiving a preview request signal for the identification mark, and displaying at least one image data mapped into a section that includes the identification mark, wherein the at least one image data is displayed according to a sequence based on its time information.

12. The method of claim 1, further comprising the steps of extracting a main thumbnail in accordance with a moving speed corresponding to the time when the recording device records image data and an amount of specific image data recorded by the recording device, and displaying the extracted main thumbnail on the path displayed in the form of line.

13. The method of claim 12, wherein the step of displaying the main thumbnail includes extracting the specific image data as the main thumbnail if the specific image data exist continuously in image data of a preset amount, wherein the preset amount is determined in accordance with the moving speed of the recording device.

14. The method of claim 12, wherein the step of displaying the extracted main thumbnail includes displaying the main thumbnail to be identified from other thumbnails.

15. A digital device comprising:
a processor controlling an operation of the digital device;
a display unit outputting images on the basis of a command of the processor;
a communication unit transmitting and receiving data to and from an external device; and
a storage unit storing the command of the processor and the data,
wherein the processor acquires at least one image data wherein the image data includes a still image or moving picture image,
extracts additional information of the acquired image data, wherein the additional information includes position information and time information of a recording device, which correspond to the time when the image data are recorded by the recording device,
generates path information on a map related to the image data, on the basis of the additional information, and
displays a path for the image data on the map in the form of line on the basis of the generated path information, and also
divides a section of the path and adjusts a line thickness of the divided section in accordance with an amount of the image data corresponding to a distance within the divided section.

16. The digital device of claim 15, wherein the processor displays the line thickness of the divided section more thickly than a reference thickness if the amount of the image data corresponding to the distance is more than a reference amount within the divided section, and displays the line thickness of the divided section more thinly than the reference thickness if the amount of the image data corresponding to the preset distance is less than a reference amount within the divided section.

17. The digital device of claim 15, wherein the processor divides the section of the path according to a preset time or distance, if the image data is a still image, and divides the section of the path to correspond to either a moving speed of the recording device or a distance moved by the recording device in a preset time, if the image data is a moving picture image.

18. The digital device of claim 15, wherein the processor displays an identification mark to identify a specific section from other sections if the specific section has a length shorter than a reference length and an amount of the image data mapped into the specific section is more than a reference amount.

19. The digital device of claim 15, wherein the processor extracts a main thumbnail in accordance with a moving speed corresponding to the time when the recording device records image data and an amount of specific image data recorded by the recording device, and displays the extracted main thumbnail on the path displayed on the map.

20. The digital device of claim 19, wherein the processor extracts the specific image data as the main thumbnail if the specific image data exist continuously in image data for a preset amount, wherein the preset amount is determined in accordance with the moving speed of the recording device.

* * * * *